United States Patent
Wang et al.

(10) Patent No.: US 8,762,785 B2
(45) Date of Patent: Jun. 24, 2014

(54) METHOD AND DEVICE FOR HANDLING EXCEPTIONS IN EMBEDDED SYSTEM

(75) Inventors: Jigang Wang, Shenzhen (CN); Shibo Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 179 days.

(21) Appl. No.: 13/258,405

(22) PCT Filed: Dec. 21, 2009

(86) PCT No.: PCT/CN2009/075806
§ 371 (c)(1),
(2), (4) Date: Dec. 8, 2011

(87) PCT Pub. No.: WO2010/142121
PCT Pub. Date: Dec. 16, 2010

(65) Prior Publication Data
US 2012/0089859 A1     Apr. 12, 2012

(30) Foreign Application Priority Data
Jun. 12, 2009    (CN) .......................... 2009 1 0203771

(51) Int. Cl.
*G06F 11/00*    (2006.01)
(52) U.S. Cl.
USPC ............................. 714/38.1; 714/25; 714/37
(58) Field of Classification Search
USPC ........................ 714/38.1, 38.13, 25
See application file for complete search history.

(56) References Cited

U.S. PATENT DOCUMENTS

| | | | | |
|---|---|---|---|---|
| 7,634,778 | B2 * | 12/2009 | Mosier et al. | ................. 719/318 |
| 2004/0268370 | A1 | 12/2004 | Mosier et al. | |
| 2005/0015579 | A1 | 1/2005 | Grover et al. | |
| 2007/0022321 | A1 * | 1/2007 | Chua et al. | ...................... 714/38 |

FOREIGN PATENT DOCUMENTS

| | | |
|---|---|---|
| CN | 1595368 A | 3/2005 |
| CN | 1275155 C | 9/2006 |
| CN | 1904852 A | 1/2007 |
| CN | 101192192 A | 6/2008 |

OTHER PUBLICATIONS

International Search Report in international application No. PCT/CN2009/075806, mailed on Apr. 1, 2010.
English Translation of the Written Opinion of the International Search Authority in international application No. PCT/CN2009/075806, mailed on Apr. 1, 2010.

* cited by examiner

*Primary Examiner* — Sarai Butler
(74) *Attorney, Agent, or Firm* — Oppedahl Patent Law Firm LLC

(57) ABSTRACT

A method and a device for handling exceptions in an embedded system are disclosed. The method comprises: establishing an exception callback linked list for an application program when the application program is running; registering an exception handling function and the corresponding relation between the exception handling function and the exception information into the exception callback linked list by the application program; when the exception is captured, searching the corresponding relation between the exception handling function and the exception information to locate an exception handling function matching the captured exception, according to the exception information of the captured exception; after a matched exception handling function is located, calling and executing the matched exception handling function to perform the exception handling. By adopting the method and the device, the direct operation of the exception handling function to the bottom layer hardware is avoided, and the portability and robustness of the software are improved.

8 Claims, 3 Drawing Sheets

METHOD AND DEVICE FOR HANDLING EXCEPTIONS IN EMBEDDED SYSTEM

TECHNICAL FIELD

The invention relates to the technical filed of software fault-tolerance, in particular to a method and a device for handling exceptions in an embedded system.

BACKGROUND

With the arrival of the age of the post personal computer (PC), embedded systems have been widely applied in key technical fields with higher reliability requirement, such as communication, aviation, national defense and industrial control, and the complexity and functions of the embedded systems increase gradually. Meanwhile, in order to utilize resources effectively, software design methods with parallel multi-application and multi-task are also adopted generally. These changes cause the increase of various faults and exceptions in the systems inevitably. When an exception occurs, if it is not handled effectively, it may cause termination of application program and system breakdown, and may even trigger disastrous accidents, which is unwilling to see.

As a common mechanism for an embedded system fault-tolerance, exception handling plays a very important role in guaranteeing the reliability of the embedded systems, but the conventional exception handling mechanism can no longer meet the development requirement of the present embedded systems.

The conventional exception handling in the embedded system adopts a manner which is similar to interrupt response, and when an exception occurs, the processor will simply store the exception site, and jump to the corresponding exception handling function by searching the exception vector table. This exception handling mechanism is closely related to the hardware architecture of the processor, in which a large number of assembly codes need to be used for writing the exception handling program to operate the register. Meanwhile, for each exception to be captured, the exception handling program has to be modified correspondingly according to the architecture of the processor, which results in poor portability and robustness of the exception handling program.

The reliability of the systems will be decreased without handling exceptions, while defective or invalid exception handling may also cause serious system faults. As the functions of the embedded systems increase continuously, multiple applications are often running in a system, and each application is composed of several tasks, wherein a task is a minimum unit that can be scheduled by the operating system and executed by the processor and that can compete for system resources, and the task can be ran independently to complete a certain relatively independent function. The conventional exception handling mechanism only performs process for tasks; if the exception handling program itself has defects or is unable to handle the occurred exception, the system will be unable to identify and resolve the exception, and the exception of a single task may spread to the application program to which the task belongs, and then influence the stable operation of the whole system.

The publication of Chinese patent application 200610104447 discloses a method for monitoring and handling exceptions for a computer application program, in which a method for monitoring and handling exceptions is provided, which can monitor not only the working condition of the application program but also each module in the program, and can perform process for program exceptions. The publication of Chinese patent application CN03157874 discloses an exception monitoring device for a multi-task system and a method thereof, in which an exception monitoring device for a multi-task system and a method thereof are provided, which extends the range of exception monitoring from single-task to multi-task, allowing to realize the functions of the exception monitoring and the automatic reset to normal operation condition in the multi-task system. Above invention patent applications have refined and extended the range of the exception monitoring, but the exception handling strategy is simplex, and secondary exceptions during the process for handling exceptions are not solved, thus exception spread may be still possible. The secondary exception is relate to an exception occurred in the exception handling program itself during the execution of the exception handling program.

The U.S. invention patent "Exception analysis methods and systems" disclosed by the publication of the U.S. patent application US2007022321 provides an exception analysis method for embedded system, which classifies exceptions that occur during the running of the system, but provides no exception handling strategy. The U.S. invention patent "Handling exceptions" disclosed by the publication of the U.S. patent application US2005015579 discloses an embedded device for handling exceptions, which comprises an exception recorder, an intelligent recovery agent and a post-exception analysis tool. Wherein, the exception recorder is used for recording information related to the exception, the intelligent recovery agent is used for detecting exceptions and determining a proper handling way to be adopted, and the post-exception analysis tool is responsible for identifying the cause of the exception. However, the intelligent recovery agent is unable to distinguish the defects of the method itself for handling exceptions and unable to solve the problems that the method for handling exceptions is invalid and the secondary exception problem.

In conclusion, the existing method for handling exceptions can no longer meet the change of the present embedded systems; a new exception handling mechanism has to be introduced to guarantee the reliable and stable operation of the systems.

SUMMARY

Certain embodiments of the present invention aim to provide a method and a device for handling exceptions in an embedded system, to solve the problem of poor portability of the exception handling program, and the problem that the exception handling program has to be modified correspondingly according to different processor architectures.

In order to solve above technical problems, an embodiment of the present invention provides a method for handling exceptions in an embedded system, comprising:

when running an application program, establishing an exception callback linked list for the application program;

registering an exception handling function and a corresponding relation between the exception handling function and the exception information into the exception callback linked list by the application program;

when capturing an exception, searching the corresponding relation between the exception handling function and the exception information to locate an the exception handling function matching the exception information of the captured exception according to the exception information of the captured exception; calling and executing the located exception handling function to perform the exception handling.

Preferably, the step of establishing an exception callback linked list for the application program comprises: establishing one level of exception callback linked list or multiple levels of exception callback linked lists;

when multiple levels of exception callback linked lists are established, the registering step further comprises: respectively registering the exception handling function and the corresponding relation between the exception handling function and the exception information into each level of exception callback linked list by the application program;

when multiple levels of exception callback linked lists are established, the searching step further comprises: searching level by level the corresponding relation between the exception handling function and the exception information to locate the exception handling function matching the exception information of the captured exception.

Preferably, when multiple levels of exception callback linked lists are established, the exception callback linked list includes a task-level exception callback linked list and an application-level exception callback linked list; the exception handling function includes a task-level exception handling function and an application-level exception handling function;

the registering step further comprises: registering an task-level exception handling function and the corresponding relation between the task-level exception handling function and the exception information into the task-level exception callback linked list, and registering the application-level exception handling function and the corresponding relation between the application-level exception handling function and the exception information into the application-level exception callback linked list.

Preferably, the searching step further comprises:

searching the corresponding relation between the task-level exception handling function and the exception information to locate an task-level exception handling function matching the exception information of the captured exception, according to the exception information of the captured exception;

when no matched task-level exception handling function is located or the exception information of the captured exception is not eliminated by the located task-level exception handling function, searching the corresponding relation between the application-level exception handling function and the exception information to locate an application-level exception handling function matching the exception information of the captured exception, according to the exception information of the captured exception.

Preferably, when a system-level exception handling strategy is configured, the searching step further comprises: when no application-level exception handling function matching the exception information of the captured exception is located in the corresponding relation between the application-level exception handling function and the exception information, or the exception information of the captured exception is not eliminated by the located application-level exception handling function, executing the configured system-level exception handling strategy to perform the exception handling.

Preferably, when multiple levels of exception callback linked lists are established and secondary exception occurs during the process of calling and executing the located exception handling function to perform the exception handling, the searching step further comprises: searching the exception callback linked list, to which the exception handling function of the occurred exception belongs, to determine whether there is an exception handling function matching the exception information of the captured exception; if there is not, searching the upper-level exception callback linked list to determine whether there is an exception handling function matching the exception information of the captured exception; when the exception handling function matching the exception information of the captured exception is located in the exception callback linked list to which the exception handling function of the occurred exception belongs, or in the upper-level exception callback linked list, calling and executing the located exception handling function matching the exception information of the captured exception.

Preferably, when the exception handling function of the occurred exception is a task-level exception handling function, the searching step further comprises: searching the task-level exception callback linked list, to which the task-level exception handling function of the occurred exception belongs, to determine whether there is an task-level exception handling function matching the exception information of the captured exception; if there is not, searching the application-level exception callback linked list to determine whether there is an application-level exception handling function matching the exception information of the captured exception, if there is not either, executing the system-level exception handling strategy.

A device for handling exceptions in an embedded system comprising: an exception control module, an exception capturing module and an exception handling module; wherein, the exception control module being arranged to establish an exception callback linked list for an application program when running the application program;

the exception capturing module being arranged to capture an exception and transmit the exception information of the captured exception to the exception handling module;

the exception handling module being arranged to provide a registration function through which the application program registers an exception handling function and the corresponding relation between the exception handling function and the exception information into the exception callback linked list; the exception handling module being further arranged to search the corresponding relation between the exception handling function and the exception information to locate the exception handling function matching the exception information of the captured exception, when receiving the exception information of the captured exception, call and execute the located exception handling function to perform the exception handling.

Preferably, the exception control module is further arranged to establish one level of exception callback linked list or multiple levels of exception callback linked lists for the application program;

the exception handling module is further arranged to respectively register the exception handling function and the corresponding relation between the exception handling function and the exception information into each level of exception callback linked list by the application program, when multiple levels of exception callback linked lists are established, and search level by level the corresponding relation between the exception handling function and the exception information to locate the exception handling function matching the exception information of the captured exception.

Preferably, when an secondary exception occurs during the process of calling and executing the located exception handling function to perform the exception handling under the condition that multiple levels of exception callback linked lists are established, the exception handling module is further arranged to search the exception callback linked list, to which the exception handling function of the occurred exception belongs, to determine whether there is an exception handling function matching the exception information of the captured exception from; if there is not, search the upper-level exception callback linked list to determine whether there is an exception handling function matching the exception information of the captured exception; and call and execute the located exception handling function matching the exception information of the captured exception, when an exception handling function matching the exception information of the captured exception is located in the exception callback linked list to which the exception handling function of the occurred exception belongs, or in the upper-level exception callback linked list.

In conclusion, embodiments of the present invention adopt the exception callback linked list structure, which avoids the direct operation of the exception handling function to the bottom layer hardware, and improves the portability and robustness of the software; the adoption of multi-level exception handling method can not only handle task-level exceptions, but also extend the exception handling process to the application-level and system-level, which greatly expand the range of handling exceptions, avoid exception spread, and provide multi-level supports for handling various exceptions by the system. Therefore, the embodiments of the present invention meet the demands of the current embedded systems on handling exceptions, which have the advantages of good expansibility, reliable system operation and wide application range. Besides, the embodiments of the present invention also have a relatively broad diversity since they are not limited to any specific hardware platform architecture and operating system type.

DETAILED DESCRIPTION

In order to bring convenience to an application development, an embodiment of the present invention provides an open type multi-level handling method, adopting an exception callback linked list to hook exception handling functions; as the linked list structure is adopted, the embodiment of the present invention can support a nesting of multi-level exception handling in a program. The developer can hook a self-defined exception handling function in different levels of exception callback linked lists according to the situation of the application, when an exception occurs, the hooked exception handling function will be called to complete the exception handling function level by level; the demands of the modern embedded systems on handling exceptions are met, through the multi-level exception handling mechanism.

In the following method embodiment, two levels of exception callback linked lists are provided for an application development: a task-level exception callback linked list and an application-level exception callback linked list.

When a task is running, a task-level exception callback linked list is allocated to the task, and the exception handling functions of the task are hooked to the linked list of the task; when the task has an exception, the exception callback linked list of the task is searched from the end to locate an exception handling function matching the occurred exception, and the located exception handling function is executed. When the task exits, the task-level exception handling functions hooked to the task-level exception callback linked list are unregistered and the linked list is destroyed; a task-level exception callback linked list is reallocated for a new running task.

The application-level exception callback linked list is corresponding to the application program, which is allocated when running the application program and hooked with application-level exception handling functions. The application-level exception handling functions are valid for the whole application program; when the task-level exception handling functions are unable to handle the exception, the application-level exception callback linked list is searched from the end to locate an application-level exception handling function matching the occurred exception, and the located handling function is executed. When the application exits, the application-level exception handling functions hooked to the application-level exception callback linked list are unregistered and the linked list is destroyed.

Figure 1:
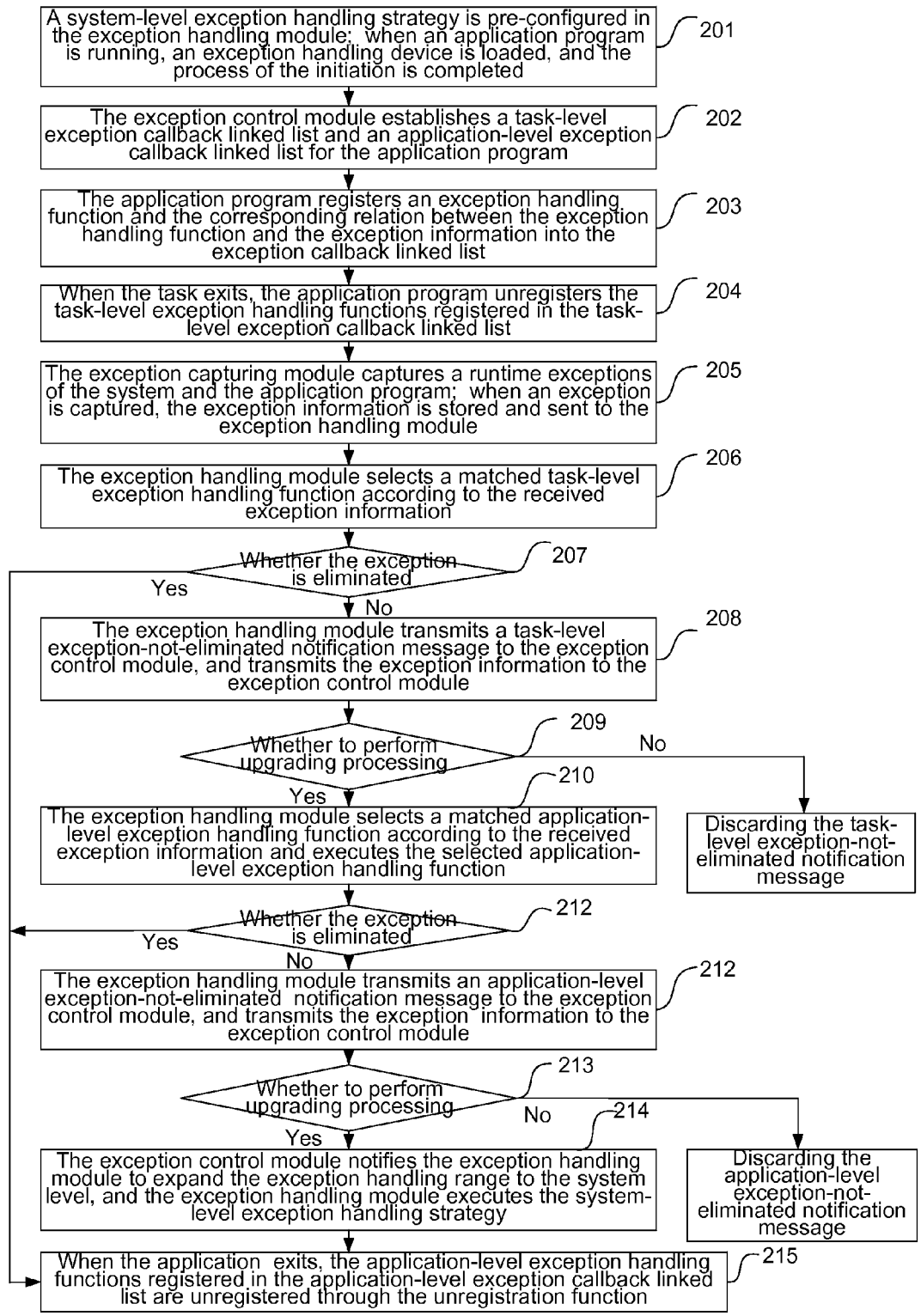
FIG. 1 is a flowchart illustrating the method according to an embodiment of the present invention.

Embodiment of the Method:

As shown in FIG. 1, the embodiment shows a flow of realizing a method for handling exceptions in an embedded system according to the embodiment of the present invention, which comprises the following steps:

Step 201: a system-level exception handling strategy is pre-configured in the exception handling module; when an application program is running, an exception handling device is loaded, and the process of the initiation is completed.

Herein, the exception handling device comprises an exception control module, an exception capturing module and an exception handling module. The system-level exception handling strategy may comprise: restarting the system or shutting down the system and so on.

Step 202: the exception control module establishes a task-level exception callback linked list and an application-level exception callback linked list for the application program.

Step 203: the application program registers an exception handling function and the corresponding relation between the exception handling function and the exception information into the exception callback linked list.

Herein, the specific handling process of Step 203 is as follows: by calling the registration function of the exception handling module, the application program registers a task-level exception handling function and the corresponding relation between the task-level exception handling function and the exception information into the task-level exception callback linked list, and registers an application-level exception handling function and the corresponding relation between the application-level exception handling function and the exception information into the application-level exception callback linked list.

Herein, the registered task-level exception handling functions are hooked to the end of the task-level exception callback linked list successively in the form of nodes; the registered application-level exception handling functions are hooked to the end of the application-level exception callback linked list successively in the form of nodes.

Herein, the exception handling functions are functions that are written in the application program and used for performing exception handling for possible problems which occur during running of the application program. One task can correspond to one or more task-level exception handling functions. The task-level exception handling functions are only valid for the task corresponding to the functions, one application can correspond to one or more application-level exception handling functions and the application-level exception handling functions are valid for the whole application progress.

Step 204: when the task exits, the application program unregisters the task-level exception handling functions registered in the task-level exception callback linked list.

Herein, the specific handling process in Step 204 is as follows: the application program unregisters the task-level exception handling functions registered in the task-level exception callback linked list by calling the unregistration function of the exception handling module; the operating system destroys the linked list; the exception control module reallocates a task-level exception callback linked list for a new running task again; and the application program registers exception handling functions for the new task in the task-level exception callback linked list.

Step 205: the exception capturing module captures a runtime exceptions of the system and the application program; when an exception is captured, the exception information is stored and sent to the exception handling module.

Herein, the exception capturing module can directly call the exception handling module, or send signals to the exception handling module.

For different CPU systems, the specific exception numbers and types may be different, mainly comprising the following types:

(1) CPU runtime exception, such as floating-point errors, divide-by-zero errors, authorized protection errors, disable instructions and undefined instructions and the like.

(2) Memory management exception, such as data writing exceptions, web page exceptions, data reading exceptions, value exceptions, misalignment exceptions and buffer zone exceptions.

Step 206: the exception handling module selects a matched task-level exception handling function according to the received exception information.

Herein, the specific handling process in Step 206 is as follows: after receiving the exception information, the exception handling module calls a filter function to traverse the corresponding relation between the task-level exception handling function and the exception information, selects a matched task-level exception handling function according to the received exception information, calls and executes the selected task-level exception handling function to perform the exception handling.

Step 207: the exception handling module searches the exception table maintained by the operating system to determine whether the exception is eliminated; if not, Step 208 is executed; otherwise, Step 215 is executed.

Step 208: the exception handling module transmits a task-level exception-not-eliminated notification message to the exception control module, and transmits the exception information to the exception control module.

Step 209: the exception control module determines whether an upgrading processing for the exception is necessary according to the exception information; if necessary, Step 210 is executed; otherwise the task-level exception-not-eliminated notification message is discarded.

Herein, if no task-level exception handling function is located, the exception handling module also requests the exception control module to determine whether to perform upgrading processing for the exception.

Herein, the exception control module can determine whether to perform upgrading processing for the exception according to whether an application-task exception callback linked list is configured, the importance of the task of the occurred exception or the load status of the system; if the importance of the task is relatively low and exception of the task will not influence the running of the system, or the load of the system is relatively large, the exception control module may selectively discard the notification message without upgrading process for the exception.

Step 210: the exception handling module selects a matched application-level exception handling function according to the received exception information and executes the selected application-level exception handling function.

The specific handling process in Step 210 is as follows: the exception control module notifies the exception handling module to expand the exception handling range to the application level; the exception handling module calls the filter function to traverse the corresponding relation between the application-level exception handling function and the exception information, selects a matched application-level exception handling function according to the received exception information, and executes the selected application-level exception handling function.

Step 211: the exception handling module searches the exception table to determine whether the exception is eliminated; if not, Step 212 is executed; otherwise Step 215 is executed.

Step 212: the exception handling module transmits an application-level exception-not-eliminated notification message to the exception control module, and sends the exception information to the exception control module.

Step 213: the exception control module determines whether an upgrading processing for the exception is necessary according to the exception information; if necessary, Step 214 is executed; otherwise the application-level exception-not-eliminated notification message is discarded.

Step 214: the exception control module notifies the exception handling module to expand the exception handling range to system level, and the exception handling module executes the system-level exception handling strategy.

Step 215: when the application exits, the application-level exception handling functions registered in the application-level exception callback linked list are unregistered through the unregistration function.

It should be noted that if a secondary exception occurs during the execution of each level of exception handling functions, after the secondary exception is captured, the exception capturing module transmits a secondary exception notification message to the exception handling module; the exception handling module traverses the exception callback linked list, to which the exceptional exception handling functions are hooked, to determines whether there is a matched exception handling function; if there is not, the second exception notification message is forwarded to the exception control module, and the exception control module determines whether an upgrading processing is necessary, and notifies the exception handling module to upgrade the exception handling range when the upgrading processing is necessary.

For example, when an exception occurs when the task-level exception handling function is running, after receiving the secondary exception notification from the exception capturing module, the exception handling module forwards the secondary exception notification message if fails to locate a substitute task-level exception handling function; if the exception control module determines that an upgrading processing is necessary, the exception handling module traverses the application-level exception callback linked list to search for the matched application-level exception handling function.

Figure 2:
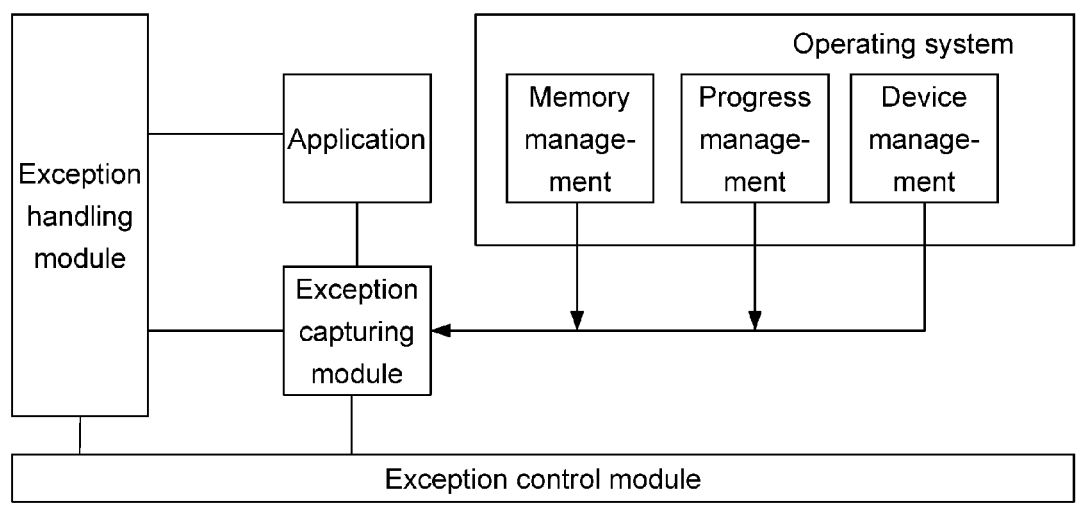
FIG. 2 is an block diagram illustrating the device according to an embodiment of the present invention.

Embodiment of the Device:

As shown in FIG. 2, the embodiment shows a specific implementation of a device for exception handling in an embedded system according to the embodiment of the invention; the device comprises an exception control module, an exception capturing module and an exception handling module.

When an application program is running, the exception control module is arranged to establish a task-level exception callback linked list and an application-level exception callback linked list for the application program after the exception control module, the exception capturing module and the exception handling module are loaded and the initiation process is completed, and determine whether an upgrading processing for the exception is necessary, according to the exception information, after receiving the task-level exception-not-eliminated notification message; if necessary, the exception handling module is notified to expand the exception handling range to the application level; otherwise the task-level exception-not-eliminated notification message is discarded; after receiving the application-level exception-not-eliminated notification message, the exception control module is further arranged to determines whether an upgrading processing for the exception is necessary according to the exception information; if necessary, the exception handling module is notified to expand the exception handling range to the system level; otherwise the application-level exception-not-eliminated notification message is discarded.

The exception control module controls the whole handling process, and ensures that the exception handling process can be executed orderly; meanwhile, the exception control module also can call system services such as runtime monitoring to perform operation of saving error information and alarm.

The exception capturing module is arranged to capture the runtime exceptions of the system and the application program; when an exception is captured, the exception capturing module stores the exception information and sends the exception information to the exception handling module.

The exception handling module is arranged to provide a register function to the application program, register the task-level exception handling function and the corresponding relation between the task-level exception handling function and the exception information into the task-level exception callback linked list, register the application-level exception handling function and the corresponding relation between the application-level exception handling function and the exception information into the application-level exception callback linked list, and provide an unregistration function to the application program; when the task exits, the application program unregisters the task-level exception handling functions registered in the task-level exception callback linked list by calling the unregistration function; when the application program exits, the application program unregisters the application-level exception handling functions registered in the application-level exception callback linked list through unregistration functions.

The exception handling module is further arranged to call a filter function to traverse the corresponding relation between the task-level exception handling function and the exception information after receiving the exception information, select a matched task-level exception handling function according to the received exception information, call and execute the selected task-level exception handling function to perform the exception handling, search the exception table maintained by the operating system to determine whether the exception is eliminated; if not, a task-level exception-not-eliminated notification message is transmitted to the exception control module and the exception information is transmitted to the exception control module; otherwise, when the application program exits, the application-level exception handling functions are unregistered; after receiving the notification to expand the exception handling range to the application level, the exception handling module is further arranged to call a filter function to traverse the corresponding relation between the application-level exception handling function and the exception information, select a matched application-level exception handling function according to the received exception information, execute the selected application-level exception handling function, and determine whether the exception is eliminated after executing the application-level exception handling function; if not, an application-level exception-not-eliminated notification message is transmitted to the exception control module, and the exception information is transmitted to the exception control module; otherwise, when the application program exits, the application-level exception handling functions are unregistered; after receiving the notification to expand the exception handling range to the system level, the system-level exception handling strategy is executed. The exception handling module also supports the self-defined handling means.

Application Case:

The method of an embodiment of the present invention will be described by taking an implementation of the embodiment of the present invention in Linux as an example. In order to be compatible to the standard Linux kernel, in the case, the method is implemented based on the standard signal mechanism.

Figure 3:
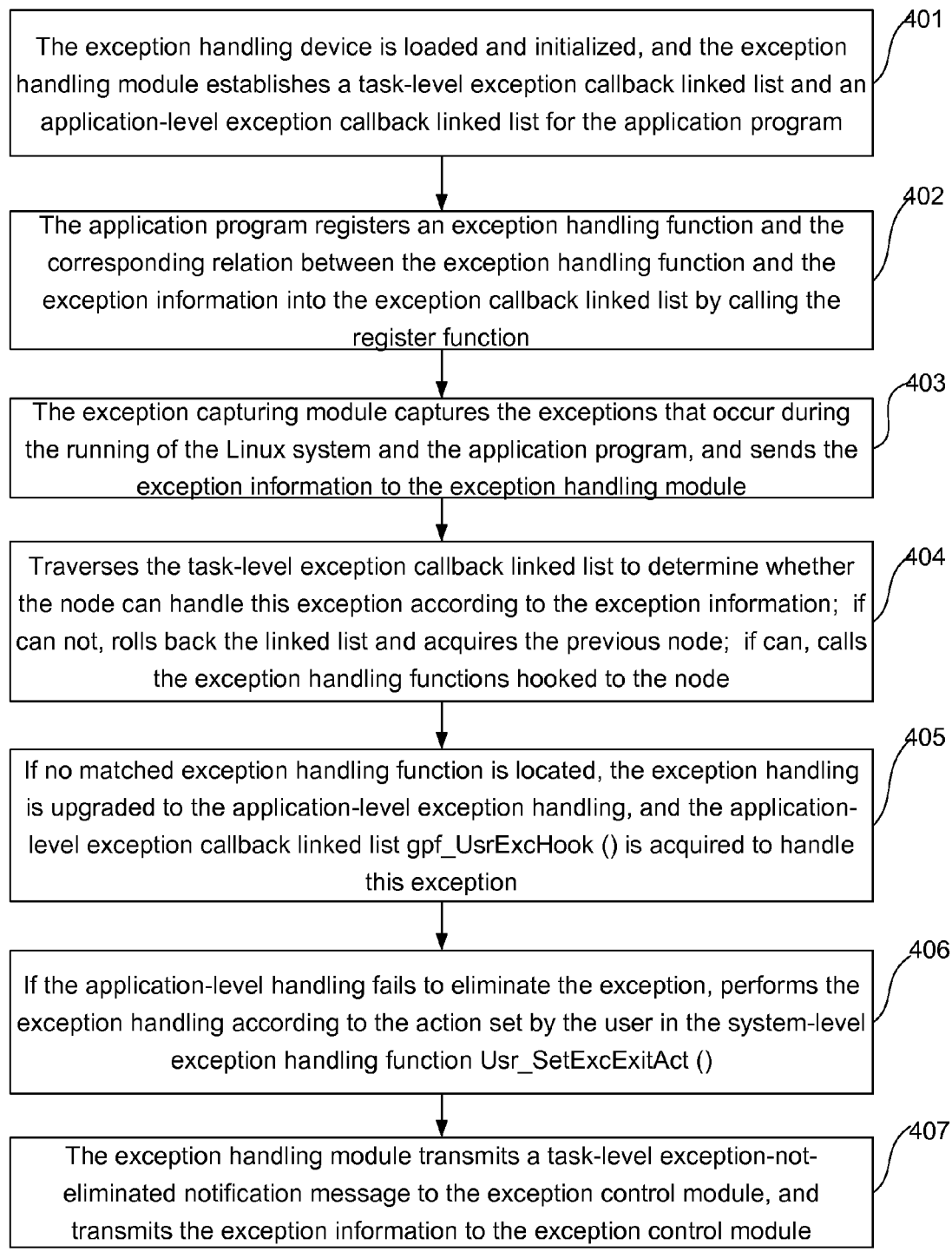
FIG. 3 is a flowchart illustrating the implementation of an embodiment of the present invention in the Linux system.

As shown in FIG. 3, the application case shows a flow for implementing the method for handling exceptions in the Linux operating system. The flow comprises the following steps:

Step 401: when the application program that needs to use the exception handling function is running, the exception handling device is loaded and initialized, and the exception handling module establishes a task-level exception callback linked list and an application-level exception callback linked list for the application program.

Step 402: the application program registers an exception handling function and the corresponding relation between the exception handling function and the exception information into the exception callback linked list by calling a register function.

Herein, the application program registers task-level exception handling functions by calling the function Usr_TrdExcHdlReg ( ) when the task exits, the application program unregisters the task-level exception handling functions and the corresponding relations by calling the function Usr_TrdExcHdlUnReg ( ). When each task is started, an exception callback linked list is allocated, the task-level exception handling functions are hooked to the end of the linked list in the form of nodes.

Herein, the application program registers application-level exception handling functions and corresponding relations between the exception information and the application-level exception handling functions by calling the function Usr_ProcExcHookReg ( ); when the application program exits, the application program registers the application-level exception handling functions by calling the function Usr_ProcExcHookUnReg ( ).

Step 403: the exception capturing module captures the exceptions which occur during the running of the Linux system and the application program, when an exception is captured, the exception handling module is called through signals and the exception information is sent to the exception handling module.

In the application case, the exception capturing module is realized based on the Linux exception capturing flow; as long as an exception can be captured by the CPU hardware, it can be captured by the exception handling module.

Step 404: after receiving the exception information, the exception handling module traverses the task-level exception callback linked list from a node at the end through the filter function on the node, determines whether the node can handle this exception according to the exception information; if it cannot, the linked list is rolled back to acquire a previous node; otherwise, the exception handling functions hooked to the node is called.

Step 405: if no matched exception handling function is found after the task-level exception handling linked list is traversed, the exception handling is upgraded to the application-level exception handling, and the application-level exception callback linked list function gpf_UsrExcHook ( ) is acquired to handle this exception.

Step 406: if the application-level handling fails to eliminate the exception within a specific time, the exception handling module upgrades the exception handling to the exception handling of the whole system; and the handling is performed according to the action set by the user in the system-level exception handling function Usr_SetExcExitAct ( )

Step 407: if a secondary exception occurs during the exception handling process, the exception handling module first traverses the current level of exception callback linked list to select other proper exception handling function; if it is unable to handle the exception, the exception handling action will be upgraded.

In conclusion, as the exception handling gradually becomes the key factor for improving the robustness and availability of the software system, according to the relative demands of the embedded systems on handling exceptions, in conjunction with the features of the exception handling mechanisms of the mainstream operating systems, an embodiment of the present invention provides a structured exception handling device comprising three main function modules: an exception capturing module, an exception handling module and an exception control module, which can cover most of characteristics of the exception handling in embedded systems. Thus, by adopting the invention, multi-faceted supports for the systems to handle various exceptions can be provided.

The invention claimed is:

1. A method for handling exceptions in an embedded system, comprising:
when running an application program, establishing an application-level exception callback linked list for the application program, and establishing a task-level exception callback linked list for each task in the application program;
registering, by the application program, task-level exception handling functions and a corresponding relation between the task-level exception handling functions and exception information into each task-level exception callback linked list, and registering application-level exception handling functions and a corresponding relation between the application-level exception handling functions and exception information into the application-level exception callback linked list;
when capturing an exception, searching the corresponding relation between the task-level exception handling function and the exception information to locate an task-level exception handling function matching exception information of the captured exception, according to the exception information of the captured exception;
when no matched task-level exception handling function is located or the captured exception is not eliminated by the located task-level exception handling function, determining whether an upgrading processing for the captured exception is necessary according to the exception information;
when it is determined that the upgrading processing for the captured exception is necessary, searching the corresponding relation between the application-level exception handling function and the exception information in the application-level exception callback linked list to locate an application-level exception handling function matching the exception information of the captured exception, according to the exception information of the captured exception;
calling and executing the located exception handling function to perform an exception handling.

2. The method according to claim 1, wherein when a system-level exception handling strategy is configured, the searching step further comprises: when no application-level exception handling function matching the exception information of the captured exception is located in the corresponding relation between the application-level exception handling function and the exception information, or the exception information of the captured exception is not eliminated by the located application-level exception handling function, executing the configured system-level exception handling strategy to perform the exception handling.

3. The method according to claim 1, wherein, when multiple levels of exception callback linked lists are established and secondary exception occurs during the process of calling and executing the located exception handling function to perform the exception handling, the searching step further comprises: searching the exception callback linked list, to which the exception handling function of the occurred exception belongs, to determine whether there is an exception handling function matching the exception information of the captured exception; if there is not, searching the upper-level exception callback linked list to determine whether there is an exception handling function matching the exception information of the captured exception; when the exception handling function matching the exception information of the captured exception is located in the exception callback linked list to which the exception handling function of the occurred exception belongs, or in the upper-level exception callback linked list, calling and executing the located exception handling function matching the exception information of the captured exception.

4. The method according to claim 3, wherein when the exception handling function of the occurred exception is a task-level exception handling function, the searching step further comprises: searching the task-level exception callback linked list, to which the task-level exception handling function of the occurred exception belongs, to determine whether there is an task-level exception handling function matching the exception information of the captured exception; if there is not, searching the application-level exception callback linked list to determine whether there is an application-level exception handling function matching the exception information of the captured exception, if there is not either, executing the system-level exception handling strategy.

5. The method according to claim 2, wherein, when multiple levels of exception callback linked lists are established and secondary exception occurs during the process of calling and executing the located exception handling function to perform the exception handling, the searching step further comprises: searching the exception callback linked list, to which the exception handling function of the occurred exception belongs, to determine whether there is an exception handling function matching the exception information of the captured exception; if there is not, searching the upper-level exception callback linked list to determine whether there is an exception handling function matching the exception information of the captured exception; when the exception handling function matching the exception information of the captured exception is located in the exception callback linked list to which the exception handling function of the occurred exception belongs, or in the upper-level exception callback linked list, calling and executing the located exception handling function matching the exception information of the captured exception.

6. The method according to claim 5, wherein when the exception handling function of the occurred exception is a task-level exception handling function, the searching step further comprises: searching the task-level exception callback linked list, to which the task-level exception handling function of the occurred exception belongs, to determine whether there is an task-level exception handling function matching the exception information of the captured exception; if there is not, searching the application-level exception callback linked list to determine whether there is an application-level exception handling function matching the exception information of the captured exception, if there is not either, executing the system-level exception handling strategy.

7. A device for handling exceptions in an embedded system, comprising: an exception control module, an exception capturing module and an exception handling module; wherein, the exception control module is arranged to establish an application-level exception callback linked list for the application program and establish a task-level exception callback linked list for each task in the application program, when the application is run;

the exception handling module is arranged to register task-level exception handling functions and a corresponding relation between the task-level exception handling functions and exception information into each task-level exception callback linked list, and register application-level exception handling functions and a corresponding relation between the application-level exception handling functions and exception information into the application-level exception callback linked list;

the exception capturing module is arranged to capture an exception and transmit exception information of the captured exception to the exception handling module;

the exception handling module is further arranged to:

search the corresponding relation between the task-level exception handling function and the exception information to locate an task-level exception handling function matching exception information of the captured exception, according to the exception information of the captured exception;

the exception control module is further arranged to, when no matched task-level exception handling function is located or the captured exception is not eliminated by the located task-level exception handling function, determine whether an upgrading processing for the captured exception is necessary according to the exception information, and notify the exception handling module to perform an upgrading processing for the captured exception when it is determined that the upgrading processing for the captured exception is necessary; and the exception handling module is further arranged to:

perform an upgrading processing for the captured exception by searching the corresponding relation between the application-level exception handling function and the exception information in the application-level exception callback linked list to locate an application-level exception handling function matching the exception information of the captured exception, according to the exception information of the captured exception; and call and execute the located exception handling function to perform the exception handling.

8. The device according to claim 7, wherein, when an secondary exception occurs during the process of calling and executing the located exception handling function to perform the exception handling under the condition that multiple levels of exception callback linked lists are established, the exception handling module is further arranged to search the exception callback linked list, to which the exception handling function of the occurred exception belongs, to determine whether there is an exception handling function matching the exception information of the captured exception from; if there is not, search the upper-level exception callback linked list to determine whether there is an exception handling function matching the exception information of the captured exception; and call and execute the located exception handling function matching the exception information of the captured exception, when an exception handling function matching the exception information of the captured exception is located in the exception callback linked list to which the exception handling function of the occurred exception belongs, or in the upper-level exception callback linked list.

* * * * *